United States Patent [19]

Konishi

[11] Patent Number: 4,800,571
[45] Date of Patent: Jan. 24, 1989

[54] TIMING JITTER MEASUREMENT DISPLAY

[75] Inventor: Tomoo Konishi, Yokohama, Japan

[73] Assignees: Tektronix, Inc., Beaverton, Oreg.; Sony-Tektronix, Inc., Tokyo, Japan

[21] Appl. No.: 142,092

[22] Filed: Jan. 11, 1988

[51] Int. Cl.$^4$ .............................................. H04B 3/46
[52] U.S. Cl. ..................................... 375/10; 364/514; 324/57 N; 358/139
[58] Field of Search ...................... 375/10; 371/22, 24, 371/25; 364/480, 481, 514, 521; 324/57 N; 358/107, 139

[56] References Cited

U.S. PATENT DOCUMENTS 4,381,546  4/1983  Armstrong .............................. 375/10
4,639,934  1/1987  Zuranski et al. ...................... 375/10

*Primary Examiner*—Robert L. Griffin
*Assistant Examiner*—Marianne Huseman
*Attorney, Agent, or Firm*—Francis I. Gray

[57] ABSTRACT

A timing pulse jitter measurement display suitable for observing large jitter deviations, such as those caused by head changes between fields of video data in a video tape or cassette recorder (VTR or VCR), selects a range of data samples about each timing pulse for processing. The data samples are acquired using a stable, jitter free, precision clock. Residual signals, such as residual subcarrier in a video signal, are removed from the selected data samples and a precise timing point is determined for each timing interval with respect to a stable reference point. The deviations of the timing points from a baseline, derived from the precision clock and representing the stable reference points occurring at a nominal timing interval, are displayed, and means provided for determining peak to peak jitter along any portion of the acquired set of displayed data samples. Averaging also is provided between acquisition sets of data samples to reduce noise and highlight phase errors due to some repetitive influence.

8 Claims, 2 Drawing Sheets

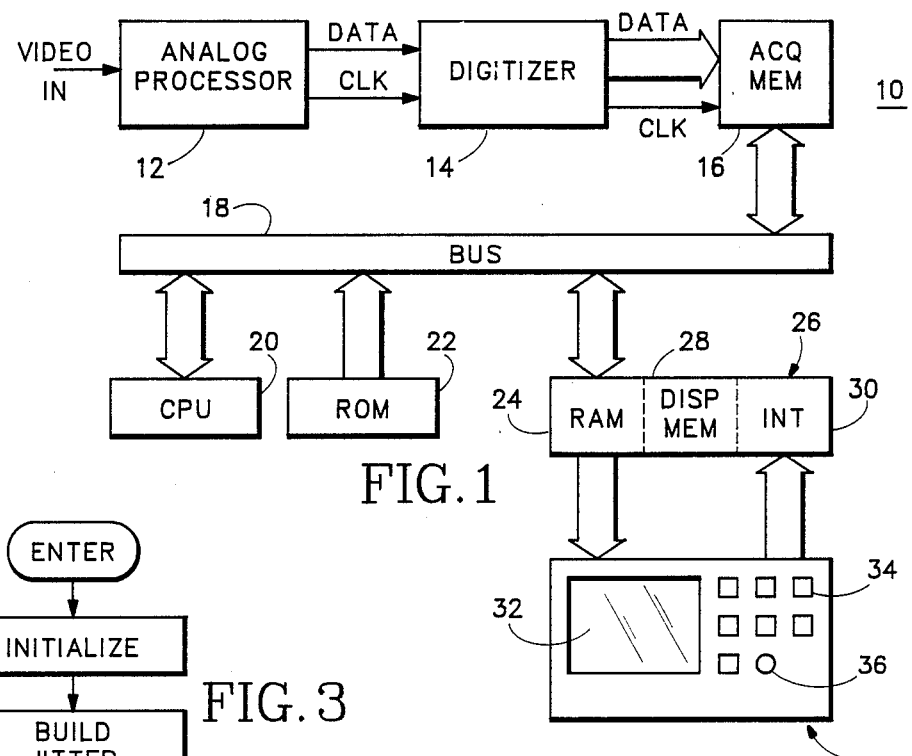
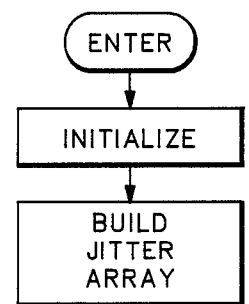
FIG. 3
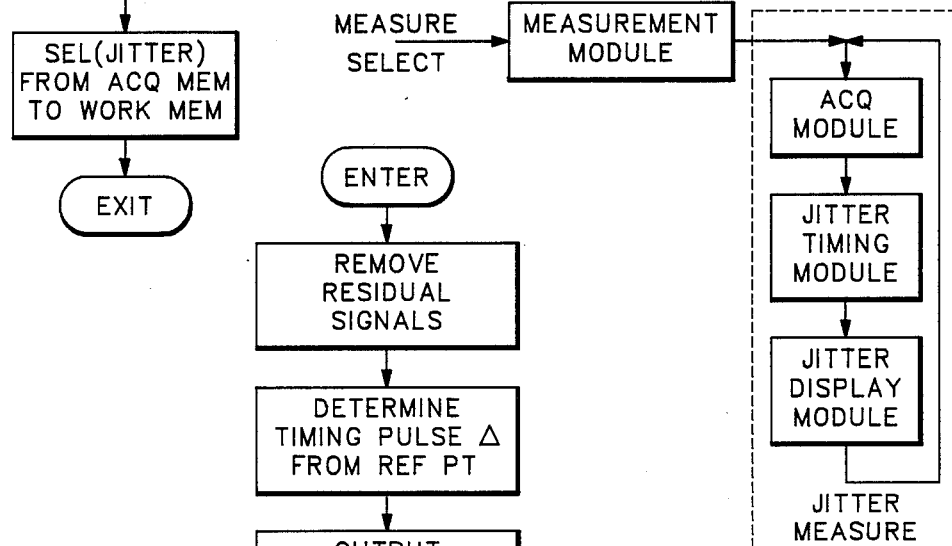
FIG. 2
FIG. 4

TIMING JITTER MEASUREMENT DISPLAY

BACKGROUND OF THE INVENTION

The present invention relates to the measurement of signal parameters, and more particularly to a method for displaying timing pulse jitter, such as horizontal sync pulse jitter for a video tape recorder (VTR) when the VTR changes heads at the end of a field of video data.

Commercial VTRs play back recorded video data via record/playback heads for display on a television monitor. At the end of each video field the VTR changes heads which induces a large amount of horizontal sync pulse jitter for a few lines at the end of the video field. Other sources of horizontal sync pulse jitter in a VTR are the varying tape tension and the mechanical capstans. At present there are no instruments capable of measuring the amount of this head change induced horizontal sync pulse jitter. There are presently two techniques for measuring VTR jitter. The first technique, as exemplified by the Shibasoku 875C VTR Jitter Meter, uses a delay line having a delay equal to one horizontal video line to obtain an incremental value between lines which can be displayed on an oscilloscope. The display is gated off during the vertical interval since the technique cannot handle the vertical pulses or large variations caused by the head changes at the end of each field. The other technique, as exemplified by the Meguro MK-611A and MK-612A Jitter Meters, uses an analog genlock system which also cannot handle rapid or large changes.

What is desired is a timing jitter measurement method which can accurately reflect rapid and large timing pulse jitter changes, such as those changes in horizontal sync pulse jitter due to VTR head switching.

SUMMARY OF THE INVENTION

Accordingly the present invention provides a method for jitter measurement of timing pulses representing a specified nominal timing interval in an acquired signal, which method is immune to large or rapid changes. A digitized acquired set of data is stored in an acquisition memory. The data is digitized using a stable, jitter free, free running clock. The data samples around each timing pulse sample are selected for processing and stored in a working memory. The exact timing point is determined by interpolation between acquired data samples. For each timing point an absolute position relative to a reference point is determined to form a display array. The reference points form a baseline which represents the nominal repetition rate, or timing intervals, for the timing points and are derived from the stable digitizing clock. The data from the display array is displayed within a window on a display screen as the difference from the baseline with each timing point being displayed on a consecutive separate display line. The maximum deviation of jitter between any display lines within the data set can be determined both numerically and graphically via cursors. Averaging of the display data between consecutive acquisition sets of data reduce noise and highlight phase errors which may be the result of some repetitive anomaly.

The objects, advantages and other novel features of the present invention are apparent from the following detailed description when read in conjunction with the appended claims and attached drawing.

BRIEF DESCRIPTION OF THE DRAWING

FIG. 1 is a block diagram of a measurement test instrument which uses the method of the present invention.

FIG. 2 is a flow chart diagram for a measurement module incorporating the timing jitter measurement method of the present invention.

FIG. 3 is a flow chart diagram for an acquisition module for the timing jitter measurement method of the present invention.

FIG. 4 is a flow chart diagram for a jitter timing module for the timing jitter measurement method of the present invention.

DESCRIPTION OF THE PREFERRED EMBODIMENT

Figure 5A:
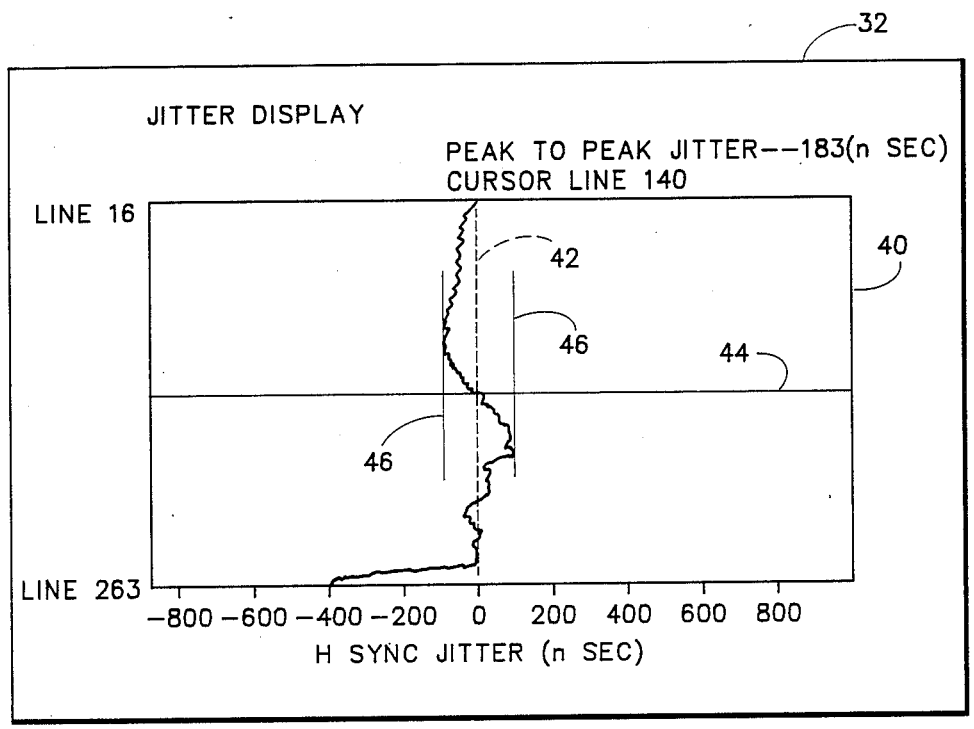
FIGS. 5(a) and 5(b) are plan views of displays of timing pulse jitter errors determined according to the present invention.

Referring now to FIG. 1 a signal, such as a composite video signal which has horizontal sync pulses occurring at a repetitive rate, is input to an analog processor 12 from which data and appropriate clock signals are output. The data and clock signals are input to a digitizer to produce digitized video data that are stored in an acquisition memory 16 under control of appropriate clock signals. The digitization is performed by using an internal stable, jitter free, precision clock, such as a crystal controlled oscillator or the like. The acquisition memory 16 is connected to a bus 18 to which also is connected a central processing unit (CPU) 20, which may be a microprocessor, with associated program memory 22, such as a read only memory (ROM). Data from the acquisition memory 16 is transferred to a working memory 24, such as a random access read/write memory (RAM), under control of the CPU 20. The output from the RAM 24 is input to a display processor 26 having a display memory 28 and an interface controller 30. The results of the display processing are shown on a screen 32, with an operator controlling the processing via buttons 34 and a rotary knob 36 located on a front panel 38, or via soft keys on the screen itself.

For measuring parameters of the input signal the CPU 20 accesses a master measurement program, as shown in FIG. 2, from the ROM 22. According to the selection of the operator via one of the buttons 34 or a soft key on the screen 32 a particular measurement routine is executed. For timing jitter measurements the first step is to select data from the acquisition memory 16 for transfer into the RAM 24 using an acquisition module of the master measurement program. The data in the acquisition memory 16 has a timing bit in addition to the data bits, and this bit is set when the data is digitized if the data sample is determined by the analog processor to be a timing sample, such as the first sample for a horizontal line of video data. As shown in FIG. 3 a jitter array is built which contains the addresses for each data sample having a set timing bit. The timing data sample having the set timing bit plus and minus a predetermined number of data samples, such as twenty, about the timing data sample, as identified by the jitter array, are selected from the acquisition memory 16 for transfer to the RAM 24.

A jitter timing module, illustrated in FIG. 4, is accessed and any residual signals, such as residual subcarrier if the data represents a composite color video signal, which may exist within the data samples selected from the acquisition memory and stored in the RAM 22 are removed, if necessary. For example where the digitizing clock has a frequency equal to four times the chrominance subcarrier frequency of a composite video signal, the residual subcarrier may be removed by adding together alternate data samples, i.e., samples one and three, samples two and four, samples five and seven, samples six and eight, etc., since alternate data samples appear at opposite phases of the subcarrier. The data points may be further limited to a lesser number of data samples around the timing data sample, such as ±12. To detect a pulse edge as a timing point, the first few samples of the range of data samples and the last few samples of the range are averaged to determine maximum and minimum values. From the maximum and minimum values the fifty percent point is determined precisely by using linear interpolation to be the pulse edge, or timing point. The difference between the actual timing point and a reference point is stored in an output array. The reference points form a baseline and occur at precisely timed intervals, derived from the digitizing clock, which are equal to the nominal interval for the timing pulses so that any deviation between the actual timing points and the baseline reflects the amount of jitter of the timing pulse for the input signal. The initial baseline point is established arbitrarily, and may correspond to the first timing point or timing data sample of the acquired data set, or to a middle timing point or timing data sample of the acquired data set, with or without an offset.

Figure 5B:
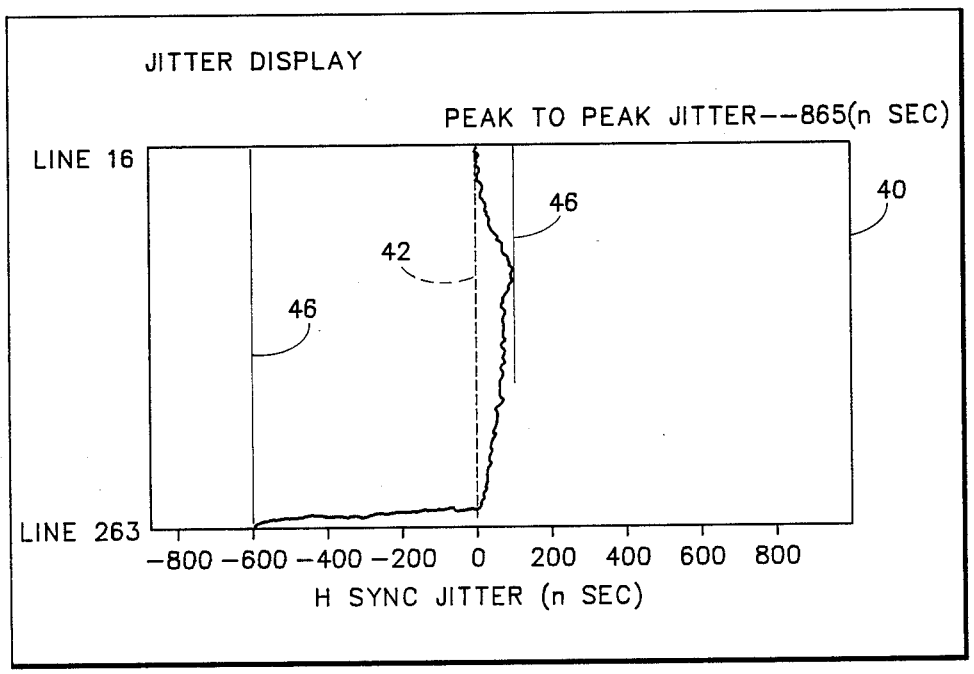

The output array is displayed as shown in Figs. 5(a) and 5(b) within a window 40 on the screen 32 which, for example, may represent a portion of a television picture between lines 15 and 263. The baseline is represented by a vertical dotted cursor 42 and the timing point data is displayed vertically about the baseline. A horizontal cursor 44 may be used to identify any particular display line to determine the amount of deviation of the timing pulse at that point from the baseline. Vertical cursors 46 may be used to delimit the maximum variation on either side of the baseline for a selected portion of the displayed timing point data to determine the maximum jitter as shown in FIG. 5(a). As shown in FIG. 5(b) the jitter caused by VTR head switching occurs at the last few lines of a video field and is quite large when compared with the peak to peak jitter during the main portion of a video picture. Also the display timing point data may be averaged from one acquisition set of data samples to the next to reduce noise and highlight any phase errors, or jitter, due to some repetitive anomaly.

Thus the present invention provides a method for measuring timing pulse jitter of signal sources, such as VTRs, by acquiring data samples of an input signal using a stable, jitter free, precision clock to digitize the signal, by then establishing a baseline which represents a precise interval between timing pulses equal to a nominal interval between timing pulses, by computing the difference between each actual timing point and the baseline, and by displaying graphically the timing pulse jitter on a unique display.

What is claimed is:

1. A method for displaying timing pulse jitter of an input signal having a timing pulse occurring at a nominal repetitive rate comprising the steps of:

acquiring from the input signal a set of digitized data samples using a free running, stable, precision clock;

selecting from the set of digitized data samples a predetermined number of samples about a timing pulse data sample corresponding approximately to a specified point on the timing pulse for each timing interval between timing pulses of the input signal;

determining a precise timing point corresponding to the specified point from the selected data samples for each timing interval with respect to a stable reference point established by the precision clock; and displaying the timing point for each timing interval as a function of a difference between the timing point and the stable reference point.

2. A method as recited in claim 1 wherein the selecting step comprises the steps of:

building a jitter array having an address for each data sample of the set of digitized data samples which represents the beginning of each timing interval, the data sample being the timing pulse data sample; and establishing a range of data samples about each timing pulse data sample for processing.

3. A method as recited in claim 1 further comprising the step of removing residual signals from the selected data samples.

4. A method as recited in claim 1 wherein the determining step comprises the steps of:

establishing a maximum and a minimum value from the selected data samples about each timing pulse data sample;

calculating a fifty percent value between the minimum and maximum values; and interpolating between selected data samples on either side of the fifty percent value to determine the timing point at a pulse edge.

5. A method as recited in claim 4 wherein the determining step further comprises the step of setting a baseline from the stable reference points which represents a nominal timing interval between timing pulses as derived from the precision clock.

6. A method as recited in claim 1 wherein the displaying step comprises the steps of:

establishing a display window on a display screen having a length in display lines corresponding to a number of timing intervals for the set of data samples and having a width scaled in time; and graphically displaying the timing point for each timing interval as a deviation from a baseline representing the stable reference points for each timing interval, the stable reference points occurring at a precise timing interval equal to a nominal timing interval for the timing pulses.

7. A method as recited in claim 6 wherein the displaying step further comprises the steps of:

measuring peak to peak timing pulse jitter via vertical cursors over any desired range of timing intervals being displayed; and displaying numerically the measured peak to peak timing pulse jitter.

8. A method as recited in claim 1 further comprising step of averaging the displayed differences over consecutive sets of digitized data samples to reduce noise and highlight phase errors due to a repetitive anomaly.

* * * * *